Patented Jan. 28, 1941

2,230,130

UNITED STATES PATENT OFFICE 2,230,130

METHOD OF OBTAINING MICROBIAN ENZYMES

Herbert Bucherer, Munich, Germany

No Drawing. Application March 18, 1938, Serial No. 196,703. In Germany August 12, 1936

3 Claims. (Cl. 195—80)

The present invention refers to a process for producing micro-organisms and enzymes capable of decomposing specific poisons.

One object of the invention is to produce enzymes capable of decomposing specific poisons by breeding suitable micro-organisms in a specific nutrient medium.

Another object of the invention is to find for each specific poison a micro-organism or microorganisms which are capable of producing enzymes decomposing said poison.

Still another object of the invention is to produce poison decomposing micro-organisms and enzymes which can be used for therapeutical purposes, for instance to decompose poisonous principles within a sick organism, as well as for industrial purposes, for instance to denicotinize tobacco.

The invention is based on the discovery that almost any poisonous matter can be decomposed enzymatically by some micro-organism, especially if such micro-organism is bred specifically for this purpose.

The following lists by way of example some micro-organisms and the poisonous principles which they are able to decompose.

1. Aniline is used as a source of carbon by micro-organisms and decomposed accordingly (Hiltner, Jahresber. d. Vereinigg. f. angew. Bot. 5, 1907, p. 215); the same applies to aniline-sulphate (R. M. Beesley, Journ. Chem. Soc. London, 105, 1914—p. 1014-1024).

2. Nicotine, baucine and strychnine are decomposed, ammonified and nitrified by micro-organisms (H. N. Batham, Soil Science 24, 1927, p. 187-203).

3. Carbonic oxide is used by the bact. oligocarbophillus as a source of carbon and oxidized into carbonic acid (Zentralblatt für Bakteriologie, Parasitenkunde und Infektionskrankheiten, Abt. II, Bd. 16, 1906, 682).

4. Toluol may be used by the bact. hexacarbovorum as an exclusive source of carbon (Störmer, Jahresber. d. Vereinigg. f. angew. Botanik 5, 1907, p. 116). On the other hand, it is a fact known to every micro-biologist that toluol is a strong disinfectant. If, therefore, toluol is added to a selective culture as the only source of carbon, toluol is used on the one hand by bact. hexacarbovorum as a source of carbon, whilst it has a poisonous action on the other microorganisms present.

5. Salicylic acid, one of the most common disinfectants, is used by various micro-organisms of the soil as a source of energy (O. Verona, Soc. Intern. Microbiol., Boll. Spez. Ital. 3, 1931, p. 218-220 ref. Biol. Abstr. 6, No. 16742).

6. According to the tests made by the applicant, potassium cyanide may be used as an exclusive source of nitrogen, if suitable sources of carbon (mannite, saccharose, dextrose) are added to the nutrient medium of moulds of the aspergillus or pennicilium group, respectively.

7. According to the tests made by the applicant, guanidine and methylguanidine are decomposed and used as their only source of carbon by aspergillus niger. Regarding the great importance of guanidine for the human and animal body, see Abderhalden Biochemisches Handlexikon vol. 12, 5 suppl.

In many cases, however, it is necessary to determine first which microorganisms are capable of extracting at least one of the basic chemicals required for their nourishment from the poisonous matter in question, before the propagation of such microorganisms and the production of the poison decomposing enzymes from the microorganisms can be started.

According to the present invention, microorganisms which are capable of disintegrating a certain poison in order to extract therefrom at least one of the basic chemicals required for their nourishment are found in the following manner.

Haphazard mixtures of several different microorganisms are inoculated into special nutrient media, to which the poisonous matter to be decomposed has been added in such a way that on the one hand the micro-organisms capable of decomposing the specific poison can develop, whilst on the other hand those micro-organisms which are incapable of doing so, are injured by lack of nutrient matter or by the poisonous nature of the nutrient medium. It is a fact known to every micro-biologist that all micro-organisms need for their nourishment certain carbon and nitrogen compounds besides mineral salts. According to the invention, a special nutrient medium to be used for selecting microorganisms capable of decomposing a certain poison, is prepared in such a manner that it contains as single source of nitrogen or of carbon the poison in question. On a nutrient medium of this type, only those microorganisms can develop which are capable of decomposing the specific poisonous matter present in the nutrient medium. In addition to the poisonous substances, the special nutrient media, according to the invention, contain, of course, all the necessary mineral substances in optimum concentration. The following nutrient solution proved to be particularly favorable for isolating bacteria: aqua destillata 1000, dipotassium phosphate .25–1 g., magnesium sulphate—.3 g., sodium chloride—.1 g., calcium carbonate—.1–10 g. sodium molybdate .002 g., copper sulphate .002 g., zinc sulphate .004 g., ferrous sulphate .020 g.

For the isolation of fungi, the neutral dipotassium phosphate is replaced by the sour monopotassium phosphate, the pH requirements of the micro-organisms to be isolated in general having to be taken into consideration to the greatest possible extent. A poisonous matter the molecule of which contains nitrogen besides carbon, is mixed in graduated quantities with the above-mentioned mineral solution, e. g. 2, 4, 6, 8 g. per liter, in order to find the optimum concentration of poison for the micro-organisms to be isolated. The nutrient medium prepared in this manner is now inoculated with various vaccines containing haphazard mixtures of different microorganisms (e. g. with different soils, dung, mud, feces), and the culture is incubated. In the course of the incubation it is ascertained by means of microscopic, chemical and, if necessary physiological methods (tests with regard to hemolysis, agglutination, experiments on animals) whether or not a decomposition of the poisonous principle occurs.

In this manner a rapid development of the micro-organisms decomposing the poison is attained, whilst the micro-organisms which are sensitive to the poison are killed or harmed. Subsequently, a loopful of the incubated culture is transplanted into a fermentation tube containing a quantity of the same nutrient solution, and again incubated. This process is repeated several times under microscopical and chemical control. The next step is the preparation of the bacilli-culture. This is effected on the agar-agar or gelatine plate, respectively. The same poison containing nutrient solution which served to select the poison decomposing micro-organisms, is mixed with 20 g. of agar-agar or 100 g. of gelatine, respectively, sterilized, cooled to 45 centigrade, inoculated with a loopful of the final culture obtained from the last transplantation, and poured into Petri dishes.

After the nutrient medium in the plates has solidified, the plates are subjected to incubation, and, in the further course of the process, the colonies of micro-organisms which have developed, are examined microscopically. By passing repeatedly over the agar-agar or gelatine plates, respectively, pure cultures are obtained which are examined as to their capacity of decomposing the poisonous principle.

Those among the micro-organisms isolated in this manner, which are capable of decomposing the poison, are propagated further in a suitable manner to obtain enzymes decomposing poison. It has been found that it is often necessary to add to the nutrient medium a separate source of carbon, even if a nitrogen containing poison-molecule which also contains carbon, e. g. guanidine or potassium cyanide, is present in the nutrient medium. If a poison-molecule is to be decomposed that does not contain any carbon, it is of course, always necessary to add to the special nutrient medium a suitable carbon compound. If the poison molecule does not contain any nitrogen at all, the special nutrient medium must be mixed with some suitable nitrogen compound in an analogous manner. Thus, there are, three specific ways of effecting the special selective culture according to the invention:

1. The deficiency culture in a nutrient medium containing the poisonous matter as the only source of carbon and of nitrogen for the micro-organisms to be isolated.

2. The deficiency culture in a nutrient medium containing in addition to the poisonous matter one or more sources of carbon while the nitrogen required for the nourishment of the microbes to be isolated is supplied solely by the poisonous principle.

3. The deficiency culture in a nutrient medium containing in addition to the poisonous matter one or more sources of nitrogen, while the carbon required for the nourishment of the micro-organisms to be isolated, is supplied solely by the poisonous principle if only small quantities of poison are available, the micro culture is employed.

The isolation of micro-organisms decomposing poison according to the method described, may, be explained by the following examples: A poisonous matter which is important as a metabolic poison as well as a micro-organism-poison is represented by guanidine. In order to isolate the micro-organisms decomposing guanidine, the mineral solution described above was mixed with graduated quantities (2, 4, 6 g. of guanidine chloride, the nutrient solutions were then placed in an Erlenmeyer glass flask, charged with different inoculation materials, and incubated. However, no sign of decomposition of guanidine could be detected, even after several weeks. Evidently, the guanidine-molecule which is rich in nitrogen had not been able to cover the carbon requirements of the micro-organisms decomposing guanidine. Subsequently, the guanidine nutrient solution mentioned above was mixed with 7 g. of mannite and 7 g. of saccharose and again inoculated with different inoculation materials, and incubated. Thereafter, a rapid development of micro-organisms was observed and, after a certain time, guanidine was no longer detectable with picric acid. A loopful of the culture thus prepared was transplanted repeatedly into glass flasks containing the nutrient solution mentioned and incubated, the decomposition of the guanidine being controlled chemically with picric acid. By repeated passage over guanidine agar-agar plates, a pure culture of the micro-organisms was obtained. Among the micro-organisms isolated in this manner, Aspergillus niger was found and also Aspergillus glaucus. In an analogous manner it was possible to find and isolate molds decomposing potassium cyanide by means of special nutrient media containing 20 g. of dextrose per liter beside 2 g. of potassium cyanide and the mineral salts mentioned.

When the first task—that of finding and isolating the micro-organisms decomposing poison—has been successful, the second task consists in continuing the propagation of the isolated microorganism in such a way that it forms the poison-decomposing enzymes to be produced. This is accomplished by using for the propagation the same poison containing nutrient medium as for the pure culture. Even if known species of bacteria prove capable of decomposing a certain poisonous principle, their propagation must be effected on a nutrient medium that has been mixed with the poison to be decomposed, as no formation of specific enzymes decomposing poison may be counted on, unless this condition for the culture is fulfilled.

The usual method is followed to secure the enzymes from the culture of micro-organisms won and propagated in this manner.

What I claim is:

1. The herein described method of producing enzymes capable of decomposing specific poisons, which method comprises preparing a nutrient medium containing as single source of at least one of the chemical elements necessary for the nourishment of micro-organisms the specific poison to be decomposed, inoculating said nutrient medium with haphazard mixtures of different micro-organisms, incubating the culture and propagating the micro-organisms grown on said nutrient medium to obtain the enzymes capable of decomposing the poison.

2. The herein described method of producing enzymes capable of decomposing specific poisons containing nitrogen, which method comprises mixing a mineral solution containing 1000 parts by weight of distilled water, 0.25–1 parts dipotassium phosphate, 0.3 parts magnesium sulphate, 0.1 parts sodium chloride, 0.1–10 parts calcium carbonate, 0.002 parts sodium molybdate, 0.002 parts copper sulphate, 0.004 parts zinc sulphate, and 0.02 parts ferrous sulphate, preparing four nutrient media by admixing to 1 liter each of said solution 2, 4, 6 and 8 g., respectively, of the poison to be decomposed, inoculating each of said media with different soils, dung, mud and feces, incubating the culture, transplanting parts of the micro-organism cultures grown on any of said nutrient media onto a fresh nutrient medium of the same type, repeating such transplantation several times, inoculating a part of the culture obtained after the last transplantation into a plate containing said nutrient medium and a substance selected from the group consisting of agar-agar and gelatine, and repeating such inoculation until pure cultures are obtained, whereupon the enzymes capable of decomposing the specific poison may be isolated from said pure cultures.

3. The herein described method of breeding micro-organisms adapted to produce enzymes capable of decomposing guanidine, which method comprises mixing a mineral solution containing 1000 parts by weight of distilled water, 0.25–1 parts dipotassium phosphate, 0.3 parts magnesium sulphate, 0.1 parts sodium chloride, 0.1–10 parts calcium carbonate, 0.002 parts sodium molybdate, 0.002 parts copper sulphate, 0.004 parts zinc sulphate, and 0.02 parts ferrous sulphate, preparing three nutrient media by admixing to 1 liter each of said solution 2, 4 and 6 g., respectively, of guanidine chloride, 7 g. of mannite and 7 g. of saccharose, inoculating each of said media with haphazard mixtures of different micro-organisms, incubating the culture, and propagating the micro-organisms grown on any of said nutrient media.

HERBERT BUCHERER.